(12) United States Patent
Shimizu et al.

(10) Patent No.: US 11,881,615 B2
(45) Date of Patent: Jan. 23, 2024

(54) ANTENNA DEVICE FOR VEHICLE

(71) Applicant: YOKOWO CO., LTD., Tokyo (JP)

(72) Inventors: Masaru Shimizu, Tomioka (JP); Tsuyoshi Komori, Tomioka (JP); Yuzou Harada, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 797 days.

(21) Appl. No.: 16/968,187

(22) PCT Filed: Feb. 7, 2019

(86) PCT No.: PCT/JP2019/004332
§ 371 (c)(1),
(2) Date: Aug. 7, 2020

(87) PCT Pub. No.: WO2019/156138
PCT Pub. Date: Aug. 15, 2019

(65) Prior Publication Data
US 2021/0044006 A1    Feb. 11, 2021

(30) Foreign Application Priority Data
Feb. 8, 2018    (JP) ................ 2018-021128

(51) Int. Cl.
B60R 11/04    (2006.01)
H01Q 1/42    (2006.01)
H01Q 9/42    (2006.01)
H04N 23/51    (2023.01)
H04N 23/54    (2023.01)
(Continued)

(52) U.S. Cl.
CPC ........... *H01Q 1/3275* (2013.01); *B60R 11/04* (2013.01); *H01Q 1/42* (2013.01); *H01Q 9/42* (2013.01); *H04N 23/51* (2023.01); *H04N 23/54* (2023.01); *B60R 2011/004* (2013.01)

(58) Field of Classification Search
None
See application file for complete search history.

(56) References Cited

U.S. PATENT DOCUMENTS

2019/0237866 A1*  8/2019  Kiyokawa ................. H01Q 1/52
2020/0366821 A1*  11/2020  Silva ....................... H04N 23/54

FOREIGN PATENT DOCUMENTS

JP    2016-116048 A      6/2016
JP    2016116048 A   *  6/2016  ............ B60R 11/02
JP    2018186360 A   *  11/2018
(Continued)

*Primary Examiner* — Ab Salam Alkassim, Jr.
*Assistant Examiner* — Anh N Ho
(74) *Attorney, Agent, or Firm* — XSENSUS LLP

(57) ABSTRACT

An antenna device for a vehicle, the antenna device includes; an antenna; a camera; and a case that accommodates the antenna and the camera, wherein the antenna includes a capacitance loading element disposed at a position separate from the camera, and when the capacitance loading element is divided into a short-distance-side portion and a long-distance-side portion based on a distance from the camera, a length of a first portion of the short-distance-side portion is shorter than a length of a second portion of the short-distance-side portion in a height direction, in which the first portion overlaps the camera in top view and/or side view while the second portion does not overlap the camera in top view and/or side view.

15 Claims, 13 Drawing Sheets

(51) Int. Cl.
*H01Q 1/32* (2006.01)
*B60R 11/00* (2006.01)

(56) References Cited

FOREIGN PATENT DOCUMENTS

| | | | | |
|---|---|---|---|---|
| JP | 2019012960 A | * | 1/2019 | |
| WO | 2017/046972 A1 | | 3/2017 | |

* cited by examiner

FIG. 5
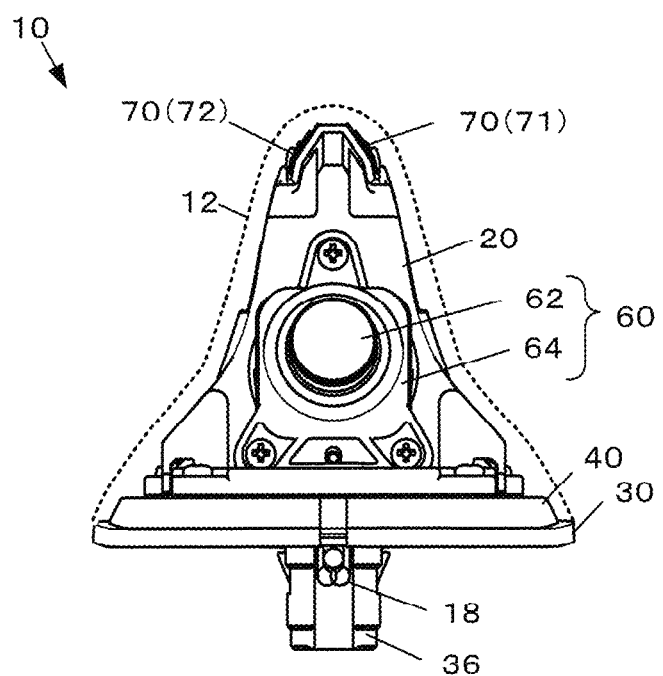
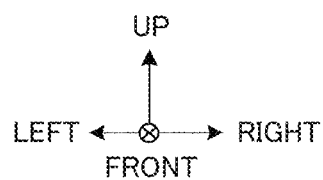

FIG. 7
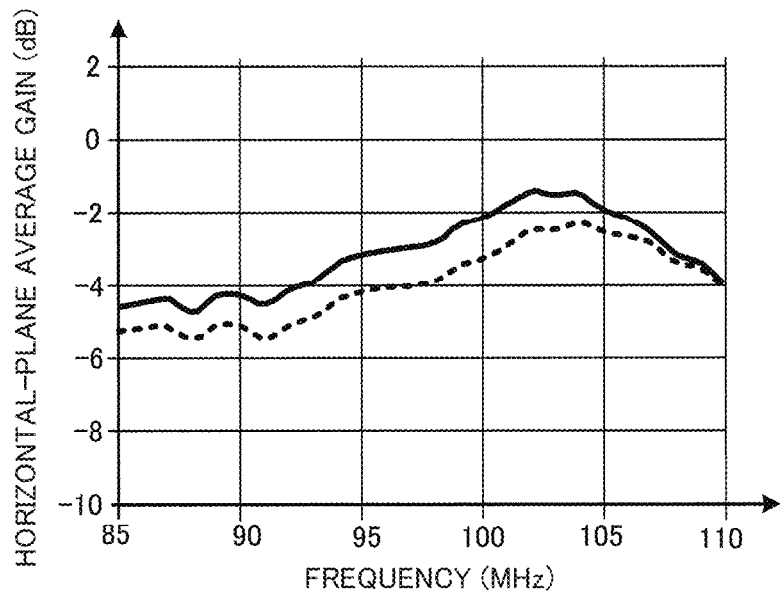
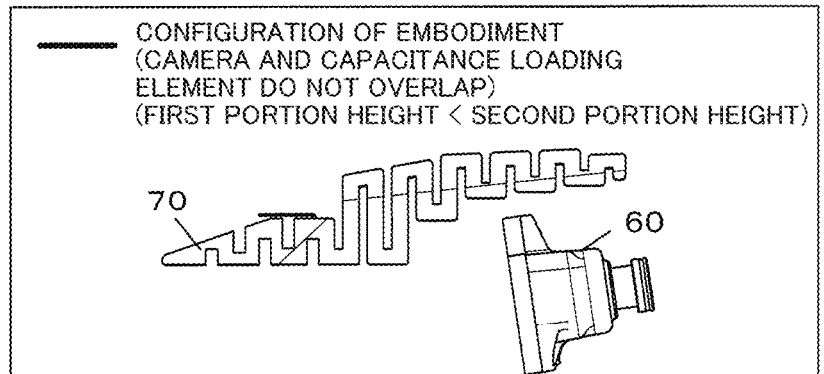
—— CONFIGURATION OF EMBODIMENT
(CAMERA AND CAPACITANCE LOADING
ELEMENT DO NOT OVERLAP)
(FIRST PORTION HEIGHT < SECOND PORTION HEIGHT)
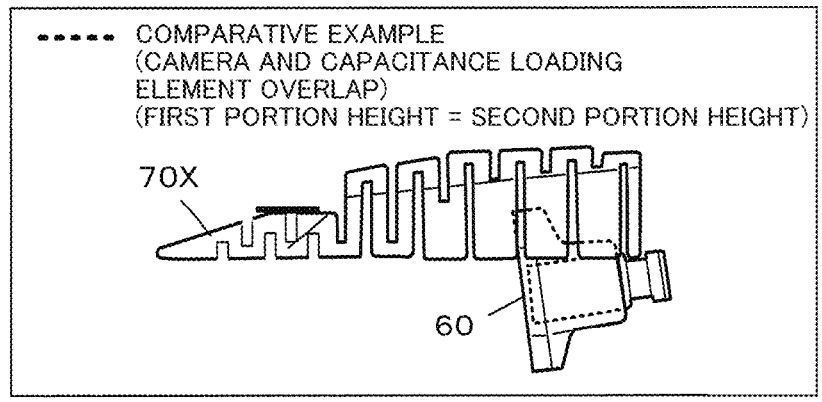
----- COMPARATIVE EXAMPLE
(CAMERA AND CAPACITANCE LOADING
ELEMENT OVERLAP)
(FIRST PORTION HEIGHT = SECOND PORTION HEIGHT)

| SEPARATION DISTANCE d [mm] | HORIZONTAL-PLANE AVERAGE GAIN [dB] | | |
|---|---|---|---|
| | WITHOUT CAMERA | WITH CAMERA | DIFFERENCE |
| — | −19.9 | — | — |
| 5 | −19.9 | −21.6 | −1.7 |
| 10 | −19.9 | −21.3 | −1.4 |
| 15 | −19.9 | −21.0 | −1.1 |
| 20 | −20.0 | −21.0 | −1.0 |
| 25 | −21.0 | −22.0 | −1.0 |

ANTENNA DEVICE FOR VEHICLE

CROSS-REFERENCE TO RELATED APPLICATIONS

The present application is based on PCT filing PCT/JP2019/004332, filed Feb. 7, 2019, which claims priority to JP 2018-021128, filed Feb. 8, 2018, the entire contents of each are incorporated herein by reference.

TECHNICAL FIELD

The present invention relates to an antenna device for a vehicle.

BACKGROUND ART

Among low profile antenna devices mounted on a roof top of a vehicle, an antenna device for a vehicle has a fin shape for reducing fluid resistance. With this shape, the antenna device for the vehicle is also called, for example, a "shark fin antenna" or a "dolphin antenna".

Multiple antennas as well as various electronic devices can be accommodated inside an antenna device for a vehicle that is called a shark fin antenna. For example, Patent Literature 1 discloses an antenna device for a vehicle including a built-in camera configured to capture an image of a rear side of a vehicle body.

PRIOR ART DOCUMENTS

Patent Literature

Patent Literature 1: Japanese Unexamined Patent Application Publication No. 2016-116048

SUMMARY OF INVENTION

Problems to be Solved by the Invention

Since an antenna device for a vehicle is mounted on a roof top of a vehicle, a size of the antenna device for the vehicle is regulated. In addition, it is required to accommodate electric and electronic devices such as an antenna and a camera in a shape for reducing fluid resistance so that mutual influence is reduced as much as possible. Thus, various features are required for the antenna device for the vehicle. In particular, improvement of antenna gain is required in any case.

The present invention is intended to provide a technology of improving antenna gain in an antenna device for a vehicle in which an antenna and a camera are accommodated.

Solution to the Problems

An antenna device for a vehicle according to an aspect of the present invention includes: an antenna; a camera; and a case that accommodates the antenna and the camera, the antenna includes a capacitance loading element disposed at a position separate from the camera, and when the capacitance loading element is divided into a short-distance-side portion and a long-distance-side portion based on a distance from the camera, a length of a first portion of the short-distance-side portion is shorter than a length of a second portion of the short-distance-side portion in a height direction, in which the first portion overlaps the camera in top view and/or side view while the second portion does not overlap the camera in top view and/or side view.

According to the present aspect, electromagnetic influence of the camera on the capacitance loading element when the capacitance loading element and the camera are electromagnetically connected with each other can be reduced as compared to a case in which the length of the first portion of the capacitance loading element is equal to or longer than the length of the second portion in the height direction, and thus the antenna gain can be improved.

In the antenna device for the vehicle, the capacitance loading element may be disposed with a longitudinal direction of the capacitance loading element being aligned with an optical axis direction of the camera, and a longitudinal length of the capacitance loading element may be longer than a longitudinal length of the camera.

With this configuration, the capacitance loading element, the longitudinal length of which is longer than the longitudinal length of the camera can be disposed with its longitudinal direction being aligned with the optical axis direction of the camera.

In the antenna device for the vehicle, the capacitance loading element may have a meander wiring shape that repeatedly meanders in the longitudinal direction, and may be disposed so that a meandering parallel wire is paralleled in the height direction.

With this configuration, it is possible that the capacitance loading element has a meander wiring shape in which meandering is repeated in the longitudinal direction and a meandering parallel wire is paralleled in the height direction. Accordingly, the capacitance loading element can have a compact configuration with a sufficient electrical length.

In the antenna device for the vehicle, the first portion may be formed to have a length gradually decreasing in the height direction as a distance from the second portion increases.

With this configuration, the length of the first portion in the height direction gradually can decrease as a distance from the second portion increases. Accordingly, electromagnetic influence of the camera on the capacitance loading element can be reduced as compared to a case in which the length of the first portion in the height direction does not gradually decrease as a distance from the second portion increases, and thus the antenna gain can be further improved.

In the antenna device for the vehicle, among a first position and a second position of the first portion, the first position may be closer to the second portion than the second position, and a length of the first portion at the first position in the height direction may be longer than a length of the first portion at the second position in the height direction.

With this configuration, the length of the first portion at the first position closer to the second portion in the height direction can be longer than the length of the first portion at the second position farther from the second portion in the height direction. Accordingly, electromagnetic influence of the camera on the capacitance loading element can be further reduced as compared to a case in which the length of the first portion at the first position in the height direction is not longer than the length of the first portion at the second position in the height direction, and thus the antenna gain can be further improved.

In the antenna device for the vehicle, the capacitance loading element may be disposed at a position higher than the camera.

With this configuration, the capacitance loading element can be disposed at a position higher than the camera. Accordingly, the antenna gain can be further improved as compared to a case in which the capacitance loading element is not disposed at a position higher than the camera.

The antenna device for the vehicle may further include an inner case accommodated in the case, and the capacitance loading element and the camera may be disposed in a space between the case and the inner case.

With this configuration, due to double cover by the case and the inner case, water-proof and dust-proof properties of an electronic device or the like disposed inside the inner case are improved as compared to a case in which no inner case is provided. Further, the height of the attachment position of the capacitance loading element can be increased as compared to a case in which the capacitance loading element is disposed inside the inner case, thereby further improving the antenna gain. Furthermore, in a case in which no inner case is provided, each electronic device or the like disposed inside the case needs to be managed with a different part number when the color of the case is different, but in a case in which the inner case is provided, the part number of each electronic device or the like disposed inside the case can be shared, which facilitates management. Moreover, an accommodation space in the case can be partitioned by the inner case, and thus the antenna, the capacitance loading element, and the camera can be efficiently disposed. The inner case may be a structural body configured to support the capacitance loading element and the camera.

In the antenna device for the vehicle, the camera may capture a rearview of the vehicle when installed on a roof of the vehicle, and the first portion may be positioned closer to a rear of the vehicle than the second portion.

With this configuration, the camera is mounted to capture the rearview of the vehicle from the roof of the vehicle.

In the antenna device for the vehicle, the camera may include a camera body and a metal housing that accommodates the camera body.

With this configuration, electromagnetic influence of the camera body is reduced by the metal housing.

In the antenna device for the vehicle, a cable of the camera may include a magnetic body.

With this configuration, noise generated by the camera to the antenna is reduced.

In the antenna device for the vehicle, an external conductor of the cable of the camera may be grounded.

With this configuration, noise generated by the camera to the antenna is further reduced.

BRIEF DESCRIPTION OF DRAWINGS

FIG. 5 is a transparent back view illustrating the exemplary configuration of the antenna device for the vehicle.

FIG. 7 is a graph illustrating characteristics of a horizontal-plane average gain of the antenna device for the vehicle.

DESCRIPTION OF EMBODIMENTS

Figure 1:
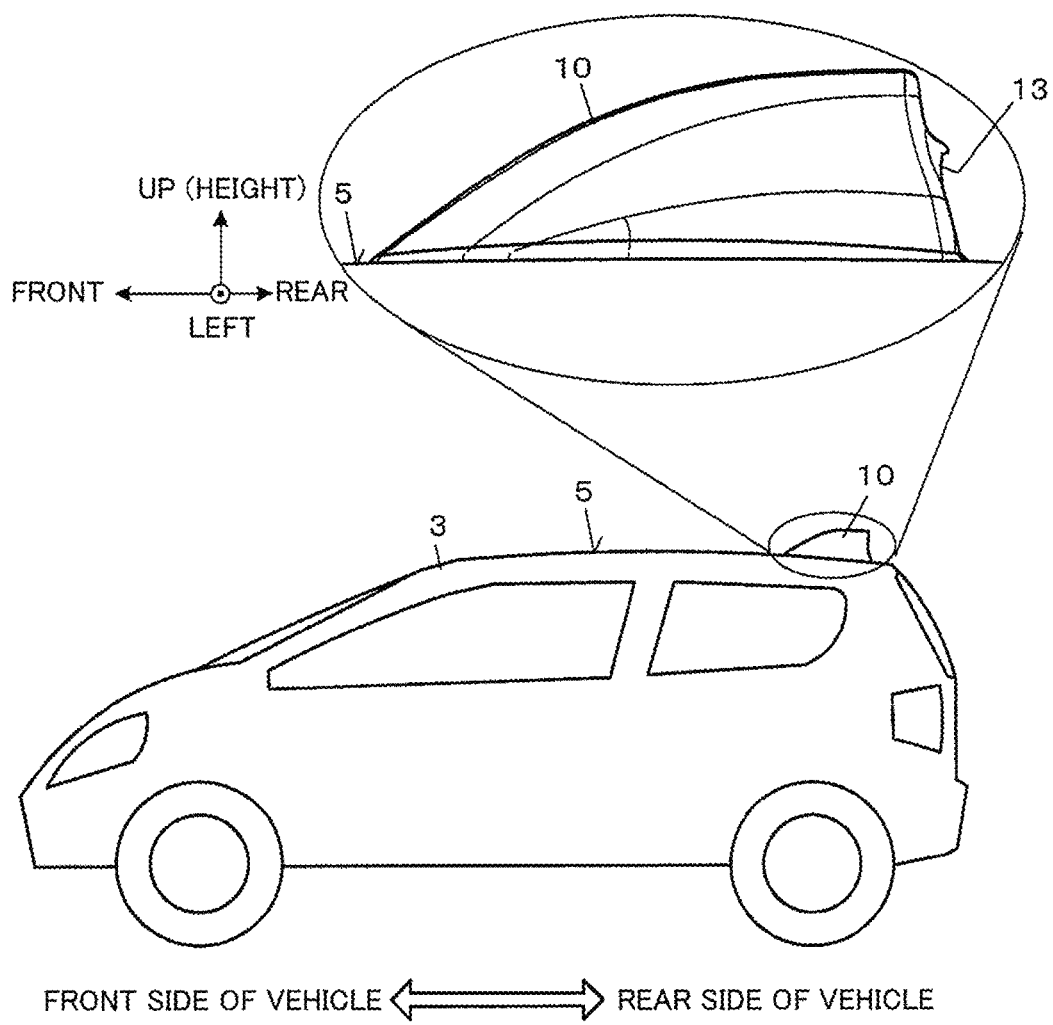
FIG. 1 is a diagram illustrating a use state of an antenna device for the vehicle.

Exemplary embodiments to which the present invention is applied will be described below, but embodiments to which the present invention is applicable are not limited to the embodiments below.

Directions in the description below are defined as follows.

Front-rear, right-left, and up-down directions of an antenna device 10 for a vehicle are defined to be same as front-rear, right-left, and up-down directions, respectively, of the vehicle when the device is mounted on the vehicle. The right-left direction and the up-down direction are referred to as a lateral direction and a longitudinal direction, respectively, in some cases. To facilitate understanding of the directions, the front-rear, right-left, and up-down directions are illustrated with arrowed line segments in the drawing. The intersection point of the arrowed line segments does not necessarily mean the origin of coordinates. In addition, the antenna device 10 for the vehicle according to the present embodiment is designed to have an appearance tapered on the front side and having a width in the right-left direction that gradually decreases as the position moves upward from an attachment surface to the vehicle, and thus this designing characteristic helps to understand the directions.

FIG. 1 is a diagram illustrating a use state of the antenna device 10 for the vehicle in the embodiment. A part surrounded by the thin-line ellipse in FIG. 1 is illustrated in an enlarged manner at an upper part in FIG. 1. In FIG. 1, the white thick arrow indicates the front-rear direction of the vehicle, and the black thin arrows indicate the front-rear direction, the right-left direction, and the up-down direction of the antenna device 10 for the vehicle.

The antenna device 10 for the vehicle is, for example, mounted on a rear upper surface of a roof 5 of a vehicle 3 that is a passenger vehicle. The antenna device 10 for the vehicle has a fin outer shape that reduces fluid resistance by rectifying traveling wind when the vehicle is traveling. Specifically, the antenna device 10 for the vehicle has an appearance tapered on the front side when viewed from above and has a width in the right-left direction that increases as the position moves toward the rear side. The antenna device 10 for the vehicle is also designed to have, when viewed from the back surface, a width in the right-left direction that gradually decreases as the position moves upward from an attachment surface to the vehicle 3. However, the appearance design is not limited thereto.

FIGS. 2 to 5 are diagrams illustrating an exemplary configuration of the antenna device 10 for the vehicle.

Figure 2:
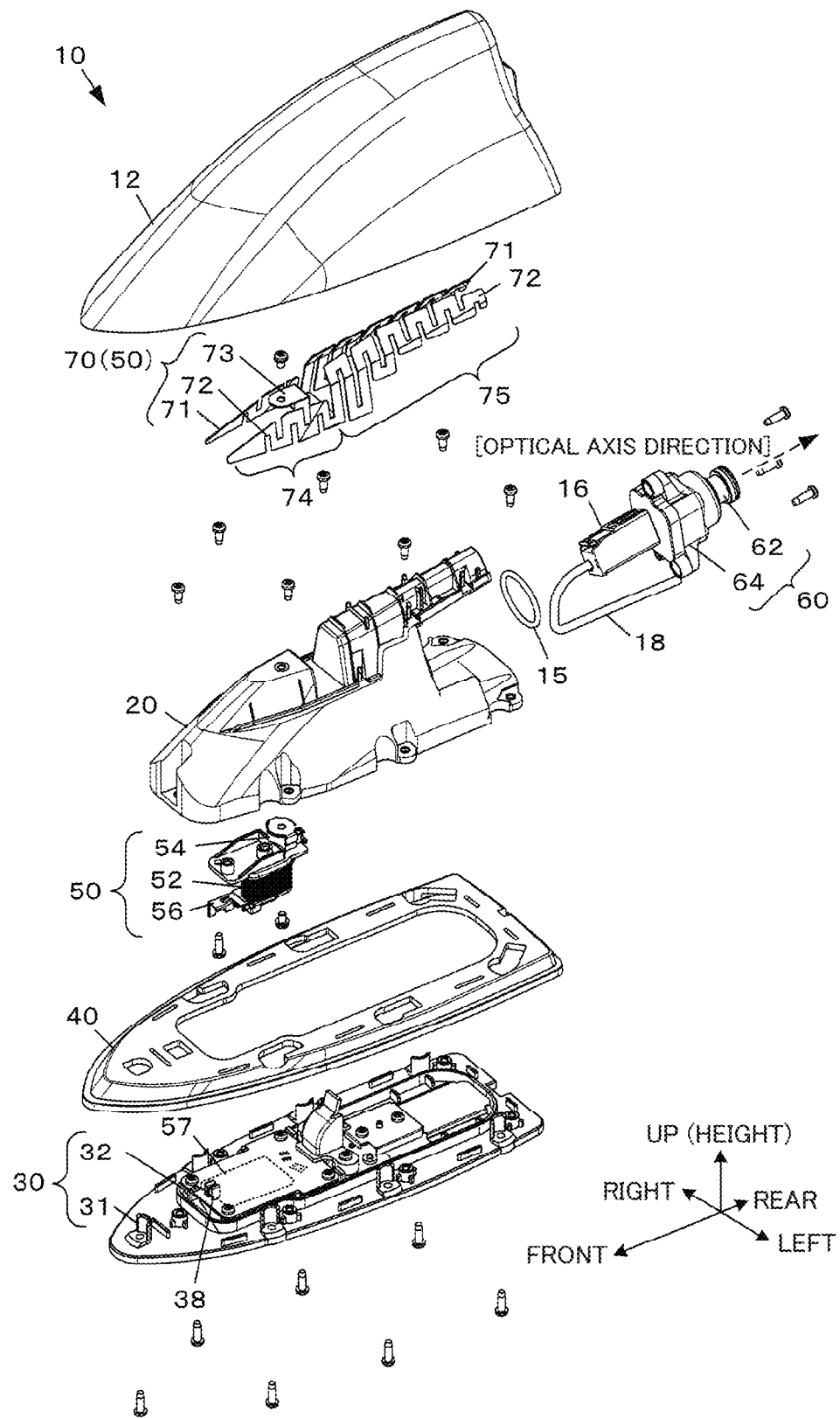
FIG. 2 is an exploded diagram illustrating an exemplary configuration of the antenna device for the vehicle.

FIG. 2 is an exploded diagram illustrating the exemplary configuration of the antenna device 10 for the vehicle.

Figure 3:
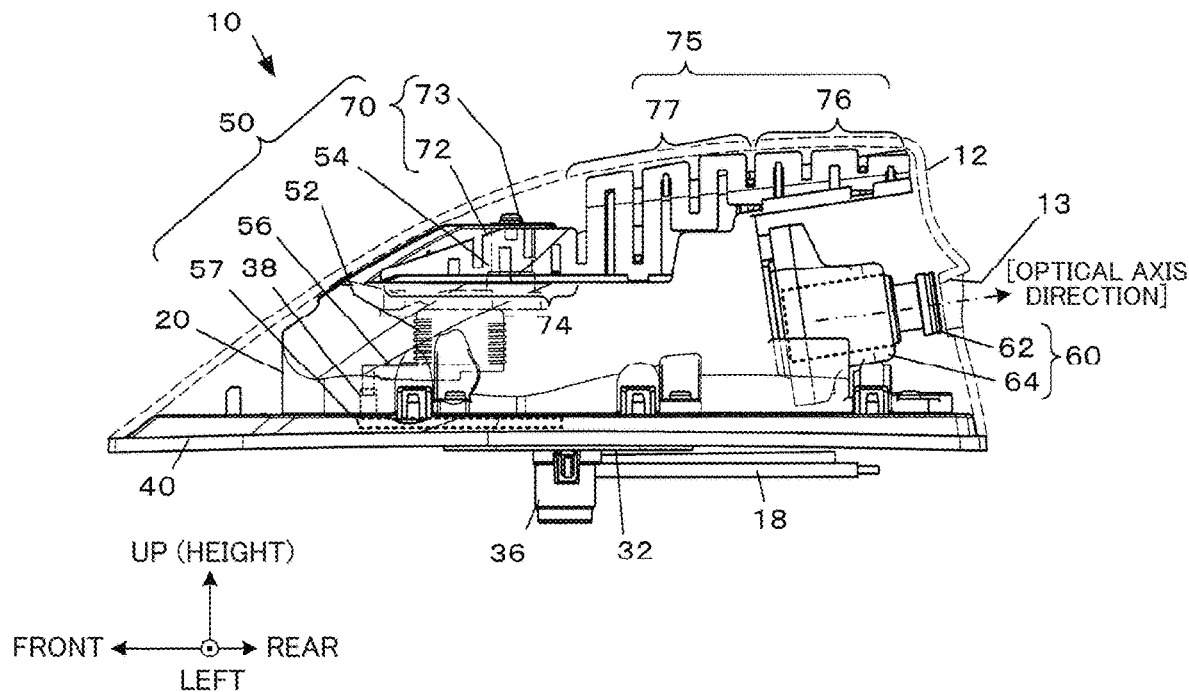
FIG. 3 is an internal structure diagram illustrating the exemplary configuration of the antenna device for the vehicle when viewed from a left side surface of the device.

FIG. 3 is an internal structure diagram of the antenna device 10 for the vehicle when viewed from a left side surface of the device, illustrating, with dashed lines, a guide for a longitudinal section at the center of an outer case 12 in the right-left direction to facilitate understanding.

Figure 4:
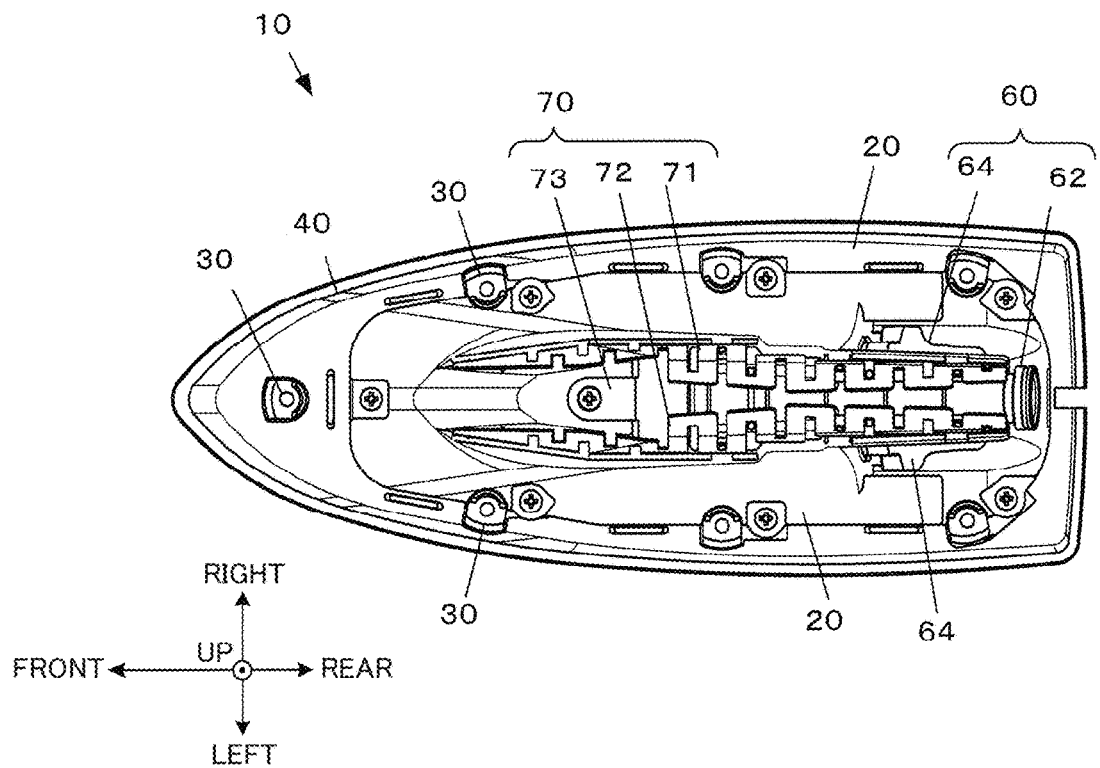
FIG. 4 is an internal structure diagram illustrating the exemplary configuration of the antenna device for the vehicle when the device is viewed from above.

FIG. 4 is an internal structure diagram of the device from which the outer case 12 is removed when viewed from above.

FIG. 5 is a transparent back view of the antenna device 10 for the vehicle, illustrating an outline of the outer case with a dashed line.

The antenna device 10 for the vehicle according to the present embodiment includes the outer case 12, an antenna base 30, and a pad 40.

The outer case 12 is made of an electric-wave transmissive synthesis resin and forms an accommodation space mainly opened downward.

The antenna base 30 includes a resin base 31 and a metal base 32.

The resin base 31 is a base part that couples parts of the device and made of an insulative synthesis resin. The metal base 32 is assembled to the resin base 31. Then, the antenna device 10 for the vehicle is fixed to the roof 5 by inserting a vehicle coupling part 36 disposed at a lower surface of the metal base 32 into the vehicle through an attachment hole provided at the roof 5 of the vehicle 3. A through-hole is provided inside the vehicle coupling part 36, and a camera cable 18 to be described later is guided from the antenna device 10 for the vehicle into the vehicle through the through-hole. Any element other than these elements may be mounted on the resin base 31 as appropriate. For example, when multiple antennas are mounted on the antenna device 10 for the vehicle, a body and an antenna substrate of each antenna may be mounted on the resin base 31.

The antenna base 30 may be entirely made of metal. The camera cable 18 may be wired into the vehicle 3 through a hole other than the through-hole of the vehicle coupling part 36. A cable holder 21 to be described later is attached to the antenna base 30 (refer to FIG. 10).

In the antenna device 10 for the vehicle, the outer case 12 and the resin base 31 are assembled to each other through the pad 40, which is soft and insulative, to form an internal space having certain water-proof and dust-proof properties.

The antenna device 10 for the vehicle includes an inner case 20, an antenna 50, and a camera 60 in the internal space. The antenna 50 includes a helical element 52, an upper terminal 54, a lower terminal 56, an antenna substrate 57, and a capacitance loading element 70.

The inner case 20 is a second case that partitions the accommodation space formed by the outer case 12 and made of an electric-wave transmissive synthesis resin. The inner case 20 is fastened to an upper surface of the resin base 31 with screws while the pad 40 is interposed therebetween, and the helical element 52, the upper terminal 54, and the lower terminal 56 are disposed inside the inner case 20. Accordingly, the helical element 52, the upper terminal 54, and the lower terminal 56 are disposed in a space doubly covered by the outer case 12 and the inner case 20 and having high water-proof and dust-proof properties. The accommodation space in the outer case 12 can be partitioned by the inner case 20, and thus the antenna 50, the capacitance loading element 70, and the camera 60 can be efficiently disposed. In a case in which the antenna device 10 for the vehicle does not include the inner case 20, each electronic device or the like disposed inside the outer case 12 needs to be managed with a different part number when the color of the outer case 12 is different, but in a case in which the antenna device includes the inner case 20, the part number of each electronic device or the like disposed inside the outer case 12 can be shared, which facilitates management.

The helical element 52 is formed by winding a conductor into a helical shape and has one end connected with the upper terminal 54 and the other end connected with the lower terminal 56 so that the helical element 52 is electrically conducted. The helical element 52 may be attached to a substrate perpendicularly installed on the antenna substrate 57 while the axial direction of the helical shape is aligned with the up-down direction. The upper terminal 54 is fastened to the capacitance loading element 70 with screws while the inner case 20 is interposed therebetween so that the upper terminal 54 is electrically conducted. The lower terminal 56 is inserted into a substrate connection terminal 38 of the antenna substrate 57 mounted on an upper surface of the metal base 32 and is electrically conducted with the antenna substrate 57. The antenna 50 in the present embodiment is an antenna configured to receive AM/FM broadcasting but may be an antenna of any other kind, and the structure of the antenna may be accordingly changed as appropriate.

The camera 60 includes a camera body 62 and a metal housing 64 and is attached at a rear part of the inner case 20 through a water-proof packing 15. The camera 60 is installed in a space between the outer case 12 and the inner case 20. The camera 60 is also attached at the center of at least one of the resin base 31 and the metal base 32 in the right-left direction. The optical axis direction of the camera 60 is set so that the camera 60 captures a rearview of the vehicle when the antenna device 10 for the vehicle is installed on the roof 5 of the vehicle 3. The camera 60 performs the image capturing through a small window 13 disposed at a rear part of the outer case 12 (refer to FIGS. 1 and 3).

A bracket may be additionally disposed between the water-proof packing 15 and the inner case 20 as appropriate. The optical axis direction of the camera 60 can be adjusted by preparing various kinds of shapes of the bracket and performing replacement with the bracket of an appropriate kind in accordance with the car type of the vehicle 3 on which the antenna device 10 for the vehicle is mounted. The small window 13 is an opening part arranged to the outer case 12 in the present embodiment but may be disposed as a transparent part made of a colorless transparent resin or the like.

The camera body 62 includes, for example, an image sensor, an optical element such as a lens, an electronic shutter, an image processing circuit, and an image signal generation circuit, and generate and outputs an image signal of a captured image. The image signal is transferred to the camera cable 18 through a cable socket 16 mounted on the front side of the camera body 62. The camera cable 18 is dragged into the vehicle body of the vehicle through the through-hole of the vehicle coupling part 36, and an image captured by the camera 60 is used for display on a back monitor of the vehicle and the like.

The metal housing 64 is a metal body that mainly covers the front side (side for attachment to the inner case 20; side oppoportion to the direction of the image capturing) of the camera body 62, and reduces radiation of electromagnetic waves generated from electric and electronic elements such as the image sensor, the electronic shutter, and the image processing circuit toward the outside of the camera 60. Since the camera body 62 is covered by the metal housing 64, interference of electromagnetic waves emitted from the camera body 62 with the antenna 50 is reduced.

The capacitance loading element 70 of the antenna 50 adds ground capacitance to the helical element 52 and is disposed at a position higher than the camera 60 in a space between the outer case 12 and the inner case 20 above the inner case 20. Specifically, the capacitance loading element 70 is disposed at a position separated from the camera 60 with its longitudinal direction being aligned with the optical axis direction of the camera 60 so that the capacitance loading element 70 partially overlaps the camera 60 in top view but does not overlap the camera 60 in side view.

Comparison indicates that the front-rear length (longitudinal length) of the capacitance loading element 70 is longer than the front-rear length of the camera 60. Since the capacitance loading element 70 is disposed above and outside the inner case 20, the height of its attachment position of the capacitance loading element 70 can be increased as compared to a case in which the capacitance loading element 70 is disposed inside the inner case 20, thereby improving the antenna gain. In addition, since the capacitance loading element 70 is disposed at a position higher than the camera 60, the antenna gain can be further improved as compared to a case in which the capacitance loading element 70 is not disposed at a position higher than the camera 60.

The capacitance loading element 70 according to the present embodiment includes a right element 71, a left element 72, and an element coupling part 73 that couples the elements. The element coupling part 73 is fastened to an upper surface of the inner case 20 with screws so that the capacitance loading element 70 is fixed to the inner case 20 and electrically conducted to the upper terminal 54 of the antenna 50 through the screws.

The shapes of the right element 71 and the left element 72 are mirror-symmetric in the right-left direction. In the present embodiment, the right element 71 and the left element 72 each have a meander wiring shape that meanders in the optical axis direction of the camera 60, and a meandering parallel wire is paralleled in the height direction. Since the right element 71 and the left element 72 are coupled with each other by the element coupling part 73, the capacitance loading element 70 according to the present embodiment has a meander shape as a whole. Accordingly, the capacitance loading element 70 can have a compact configuration with a sufficient electrical length.

The repetition number of meandering in the meander shape and the electrical length of the wire may be set as appropriate. The shapes of the right element 71 and the left element 72 are desirably mirror-symmetric in the right-left direction but do not necessarily need to be mirror-symmetric.

Figure 6:
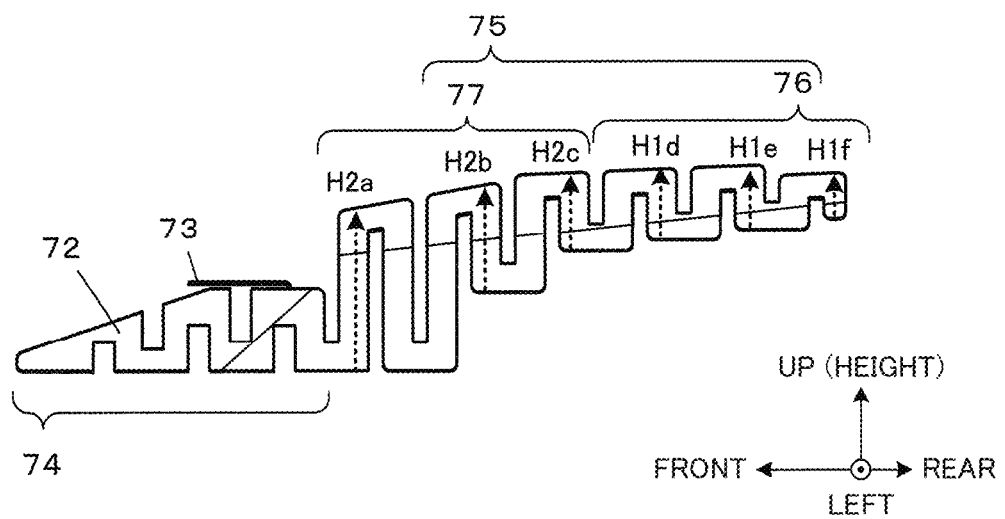
FIG. 6 is a left side view illustrating an exemplary configuration of a capacitance loading element.

FIG. 6 is a left side view illustrating an exemplary configuration of the capacitance loading element 70.

When the right element 71 and the left element 72 are each divided into a short-distance-side portion 75 and a long-distance-side portion 74 based on the distance from the camera 60, the short-distance-side portion 75 includes a first portion 76 and a second portion 77. The first portion 76 overlaps the camera 60 in top view but does not overlap the camera 60 in side view. The second portion 77 is positioned on the vehicle front side of the first portion 76 and does not overlap the camera 60 in top view and side view. The length of the first portion 76 is set to be shorter than that of the second portion 77 in the height direction.

Specifically, comparison between the lengths of the parallel wire corresponding to wire parts extending in the up-down direction in the meander shape of the short-distance-side portion 75 indicates that the lengths of the first portion 76 in the height direction (lengths H1$d$, H1$e$, and H1$f$ are representatively indicated in FIG. 6) is shorter than the lengths of the second portion 77 in the height direction (lengths H2$a$, H2$b$, and H2$c$ are representatively indicated in FIG. 6). More specifically, parts of the parallel wire in the first portion 76 closer to the second portion 77 have longer lengths in the height direction. In the present embodiment, the first portion 76 is formed to have a length gradually decreasing in the height direction as a distance from the second portion 77 increases (in FIG. 6, H1$d$>H1$e$>H1$f$).

FIG. 7 is a graph illustrating characteristics of a horizontal-plane average gain of the antenna device 10 for the vehicle according to the present embodiment. The solid line indicates the gain of the antenna device 10 for the vehicle according to the present embodiment. The dashed line corresponds to a comparative example. As illustrated in FIG. 7, a capacitance loading element 70X of the comparative example has a configuration in which a portion corresponding to the first portion 76 of the antenna device 10 for the vehicle overlaps the camera 60 in top view and side view.

The capacitance loading element 70 of the antenna device 10 for the vehicle according to the present embodiment is designed so that the capacitance loading element 70 is separated from the camera 60 as far as possible and the area of a part overlapping the camera 60 in top view and side view is as small as possible. Accordingly, electromagnetic influence of the camera body 62 on the outside is reduced even when the metal housing 64 is disposed, and thus the horizontal-plane average gain is higher than that of the comparative example in the entire range of a frequency represented by the horizontal axis of the graph.

The following describes a measure against noise that the camera 60 may generate to the antenna 50.

Figure 8:
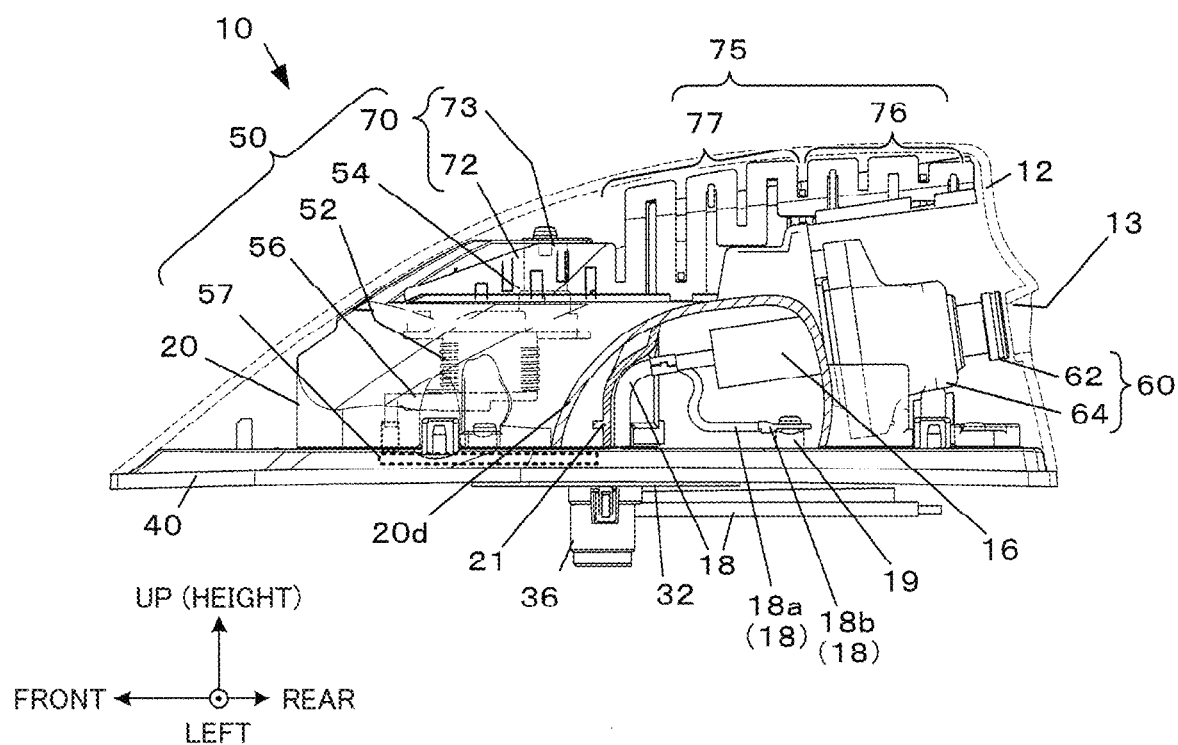
FIG. 8 is an internal structure diagram illustrating the exemplary configuration of the antenna device for the vehicle when viewed from the left side surface of the device.

FIG. 8 is a diagram for description of the measure against noise of the camera 60. In FIG. 8, part of the inner case 20 in the internal structure diagram of the antenna device 10 for the vehicle illustrated in FIG. 3 is further cut out to illustrate the vicinity of the cable socket 16. A cutout section of the inner case 20 is indicated as a case section 20$d$. The measure against noise of the camera 60 is not a measure for reducing noise received by the camera 60, which is a characteristic. The measure against noise is not required for the operation of the camera 60. The measure is provided to the camera 60 against noise generated by the camera 60 for the antenna 50.

Although not illustrated in FIG. 2, the camera cable 18 includes a bifurcation line 18$a$ including a terminal 18$b$ at a leading end part as illustrated in FIG. 8. The camera cable 18 is a coaxial cable including a magnetic body.

The bifurcation line 18$a$ is connected with an external conductor of the camera cable 18. The terminal 18$b$ is screwed to a conductive rib 19 electrically connected with the metal base 32. Accordingly, the external conductor of the camera cable 18 is grounded.

The camera cable 18, which contains a magnetic body, may be referred to as a magnetic cable.

Figure 9:
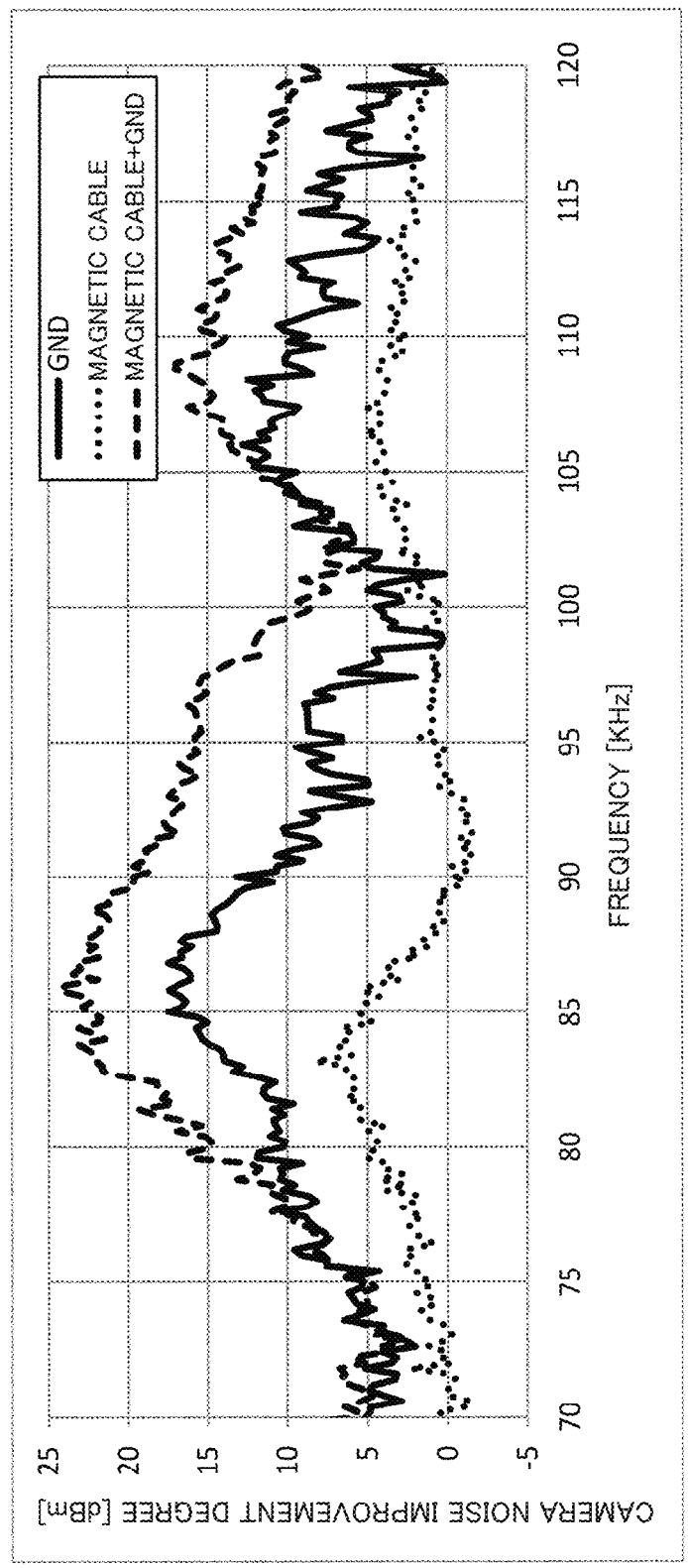
FIG. 9 is a graph illustrating characteristics of the horizontal-plane average gain of the antenna device for the vehicle while a camera is activated.

The measure against noise for the antenna 50 is achieved by the camera cable 18 having the above-described characteristic configuration. The following describes the effects of the measure against noise with reference to FIG. 9. FIG. 9 is a graph illustrating the degree of noise improvement in an FM wave band while the camera 60 is activated. The difference of camera noise when various cables are used with respect to camera noise when a coaxial cable containing no magnetic body and not grounded is used is indicated as the degree of noise improvement. A positive degree of noise improvement indicates reduction of noise reception, and as the value increases, the measure against antenna noise from the camera becomes more excellent.

In FIG. 9, the solid line indicates the degree of noise improvement when a coaxial cable containing no magnetic body is used with its external conductor being grounded. The dotted line indicates the degree of noise improvement when a magnetic cable which is not grounded is used since no bifurcation line 18a is arranged. The dashed line indicates the degree of noise improvement when the camera cable 18 according to the embodiment, which is a magnetic cable grounded through the bifurcation line 18a, is used.

As understood from the graph of the dotted line, noise reception can be reduced with a magnetic cable not grounded. As understood from the graph of the solid line, noise reception can be reduced also with a coaxial cable containing no magnetic body when the coaxial cable is grounded. As understood from the graph of the dashed line, the degree of noise improvement is largest with the camera cable 18 according to the present embodiment, which is a magnetic cable grounded, and influence of noise that is potentially mixed into a signal received through the antenna 50 can be reduced most.

Figure 10:
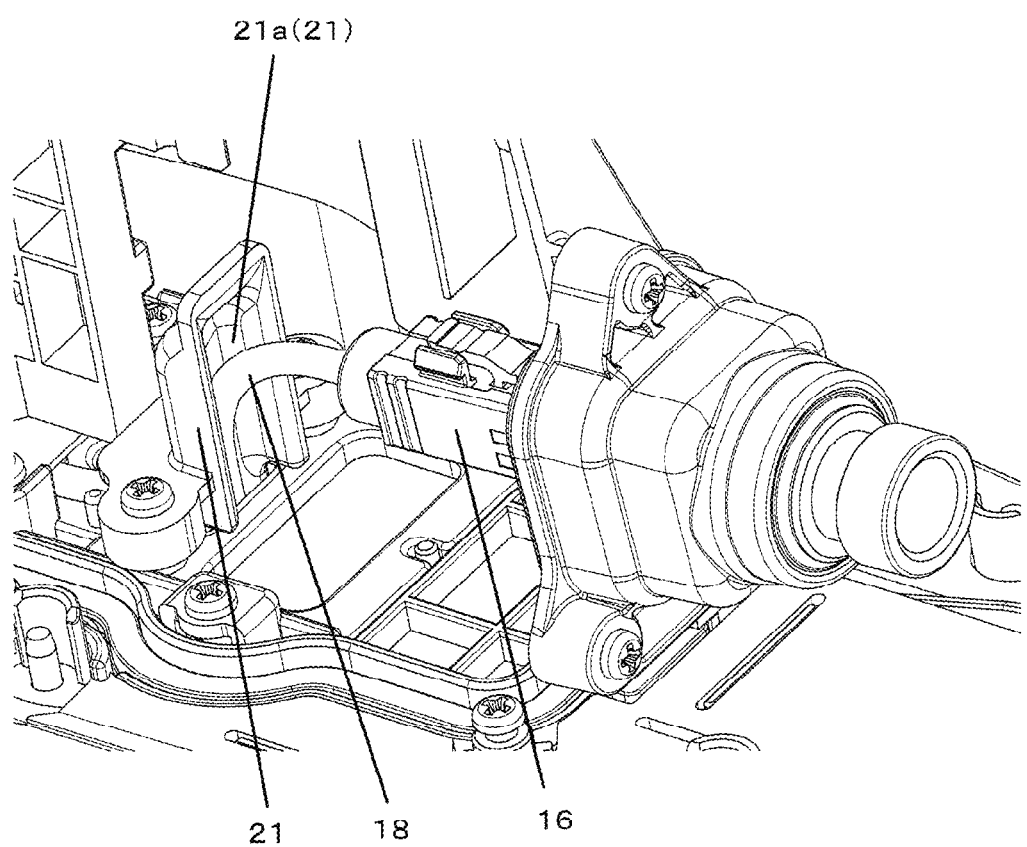
FIG. 10 is a partially perspective view of a cable holder and its surroundings when viewed from above.
Figure 11:
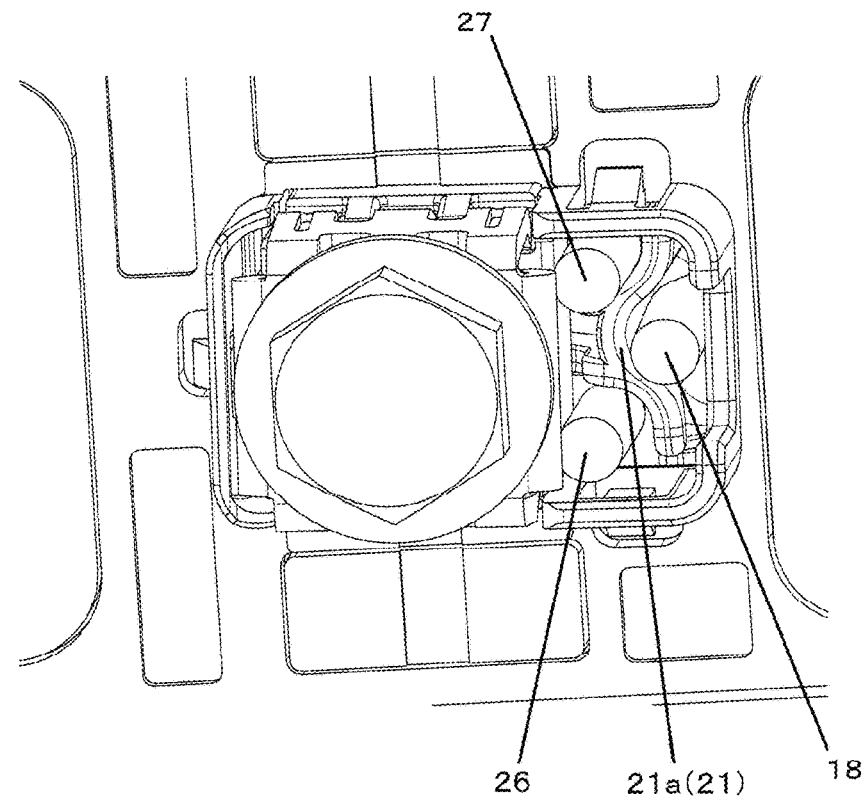
FIG. 11 is a diagram of the cable holder and its surroundings when viewed from below.

In addition to the measure against noise by the camera cable 18, the cable holder 21 as illustrated in FIG. 8 is disposed inside the inner case 20 for easiness of wiring by a worker. FIGS. 10 and 11 each illustrate a partially perspective view in which the vicinity of the cable holder 21 is enlarged. FIG. 10 is a partially perspective view of the cable holder 21 and its surroundings when viewed from above. FIG. 11 is a diagram of the cable holder 21 and its surroundings when viewed from below, illustrating cables as end faces. FIG. 10 is a simplified diagram in which the bifurcation line 18a and the rib 19 are omitted.

Without the cable holder 21, such a problem potentially occurs that the camera cable 18 contacts parts of the antenna and changes the installation position of an antenna element when the worker assembles the antenna device 10 for the vehicle. Specifically, when the antenna device 10 for the vehicle is to be assembled, the camera cable 18 is wired through the inner case 20 and connected with the camera 60. Thereafter, the camera 60 is attached to the inner case 20. After the attachment of the camera 60 to the inner case 20, the inner case 20 is fixed to the antenna base 30, and the camera cable 18 is pulled out through a cable hole of the vehicle coupling part 36. However, the camera cable 18 potentially contacts various antenna elements when the camera cable 18 is pulled out through the cable hole. When the installation position of an antenna element is shifted upon the contact, the electric property of the antenna is potentially changed from a designed value. Thus, the antenna device 10 for the vehicle halfway through assembly needs to be disassembled to inspect whether each part of the antenna has anomaly and to replace a component or adjust the installation position of each part in some cases.

In the present embodiment, the cable holder 21 for separating the wiring position of the camera cable 18 from the antenna 50 is disposed. For example, the cable holder 21 is attached onto, for example, the antenna base 30 to cover a cable hole into which an antenna cable and the camera cable 18 can be inserted and that is formed through the antenna base 30. In addition, a partition 21a is provided to the cable holder 21. With this configuration, for example, when the worker pulls out the camera cable 18 through the cable hole, the camera cable 18 contacts the partition 21a of the cable holder 21 while being pulled out through the cable hole. Thus, the camera cable 18 can be prevented from contacting an antenna element. In addition, the distance between the camera cable 18 and each antenna element is maintained by the cable holder 21 after the assembly is completed. Accordingly, after the antenna device 10 for the vehicle is attached to the vehicle 3, as well, the camera cable 18 can be prevented from contacting an antenna element, thereby preventing decrease of the electric property of the antenna 50.

When the cable holder 21 is attached onto the antenna base 30, a first region into which antenna cables 26 and 27 can be inserted and a second region into which the camera cable 18 can be inserted are formed by the partition 21a and the cable hole. In the example illustrated in FIG. 11, a wall that further divides the first region is formed, and the two antenna cables 26 and 27 are inserted into the cable hole. When the first region and the second region are formed in this manner, an insertion space for each of the antenna cables 26 and 27 and the camera cable 18 can be secured. As a result, for example, when the camera cable 18 is inserted after the antenna cables 26 and 27 are inserted, the camera cable 18 can be smoothly and securely inserted without touching the antenna cables 26 and 27.

When the cable holder 21 is not disposed, for example, the antenna base 30 needs to be divided to form the first region into which the antenna cables 26 and 27 can be inserted and the second region into which the camera cable 18 can be inserted. In the present embodiment, since the partition 21a is provided to the cable holder 21, the first region and the second region are formed without dividing the antenna base 30. In addition, since the antenna base 30 does not need to be divided, the freedom of the arrangement position of the camera 60 is increased.

MODIFICATIONS

Although the exemplary present embodiment to which the invention is applied is described above, a form to which the present invention is applicable is not limited to the above-described embodiment, but a constituent element may be added, omitted, and changed as appropriate.

First Example of Modifications

For example, in the above-described embodiment, only one antenna 50 is mounted, but multiple antennas may be mounted.

Second Example of Modifications

Figure 12:
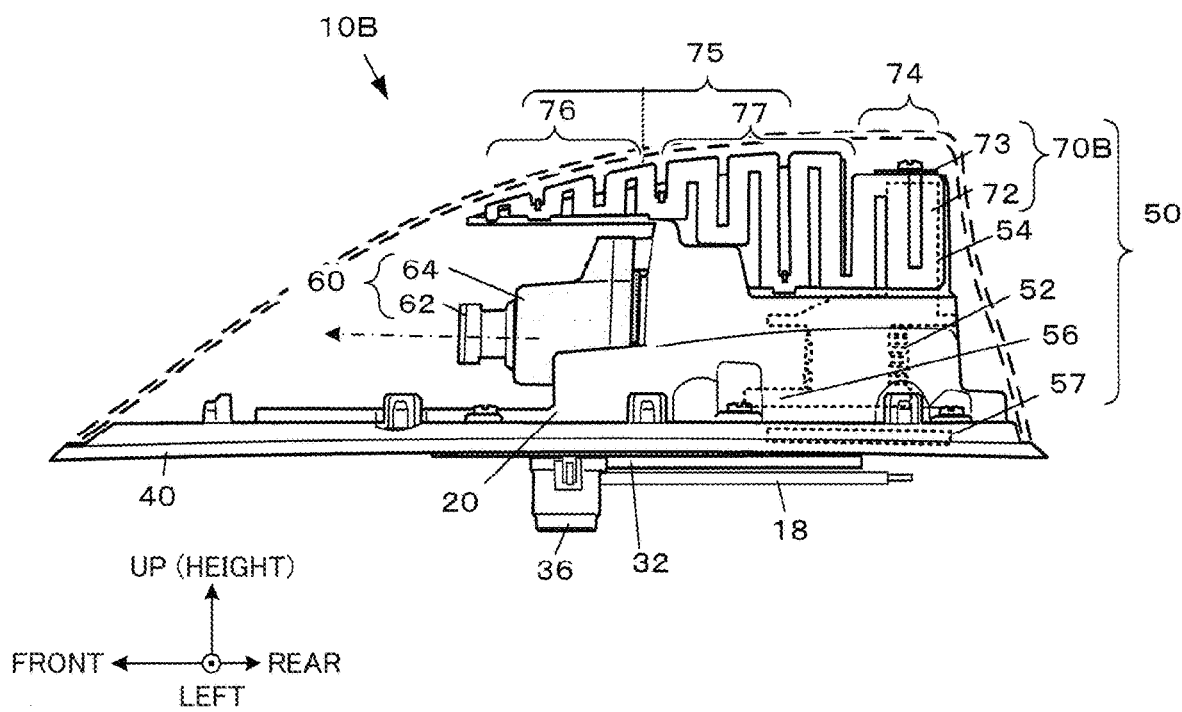
FIG. 12 is an internal structure diagram for description of an exemplary configuration of the antenna device for the vehicle in Modification 2 when viewed from the left side surface of the device.

In the above-described embodiment, the direction of image capturing by the camera 60 points to the vehicle rear side when the antenna device 10 for the vehicle is mounted on a vehicle, but may point to the vehicle front side when the antenna device 10 for the vehicle is mounted on the vehicle 3 like, for example, an antenna device 10B for the vehicle illustrated in FIG. 12. A capacitance loading element 70B thus configured has a configuration obtained by inverting the configuration of the capacitance loading element 70 of the above-described embodiment in the front-rear direction.

Third Example of Modifications

In the above-described embodiment, the first portion 76 of the capacitance loading element 70 is designed not to overlap the camera 60 in side view. However, as in a capacitance loading element 70C of an antenna device 10C for the vehicle illustrated in FIG. 13, the first portion 76 may partially overlap the camera 60 in side view, depending on the degree of electromagnetic influence of the camera 60.

Fourth Example of Modifications

In the above-described embodiment, the capacitance loading element 70 has a meander shape as a whole. More specifically, the right element 71 and the left element 72 each have a meander shape. However, the right element 71 and the left element 72 each may not have a meander shape but may be a plate member. In addition, the right element 71 and the left element 72 as plate members may be integrated with the element coupling part 73.

Fifth Example of Modifications

In the above-described embodiment, the capacitance loading element 70 is disposed at a position separated from the camera 60 with its longitudinal direction being aligned with the optical axis direction of the camera 60 so that the capacitance loading element 70 partially overlaps the camera 60 in top view but does not overlap the camera 60 in side view. The separation distance between the capacitance loading element 70 and the camera 60 may be set as appropriate. In addition, the shape of the capacitance loading element 70 may be set based on the separation distance.

Figures 13, 14:
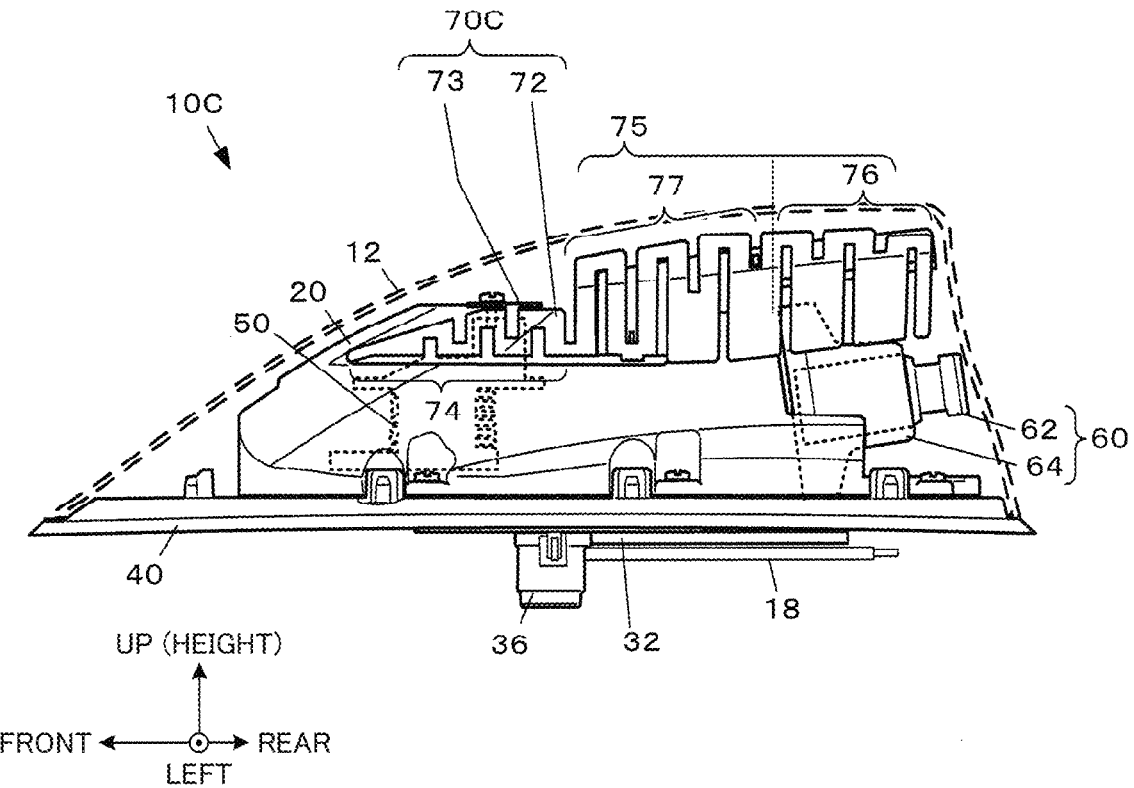
FIG. 13 is an internal structure diagram for description of an exemplary configuration of the antenna device for the vehicle in Modification 3 when viewed from the left side surface of the device.
FIG. 14 is a diagram illustrating the relation between separation distance and the horizontal-plane average gain.
Figure 15:
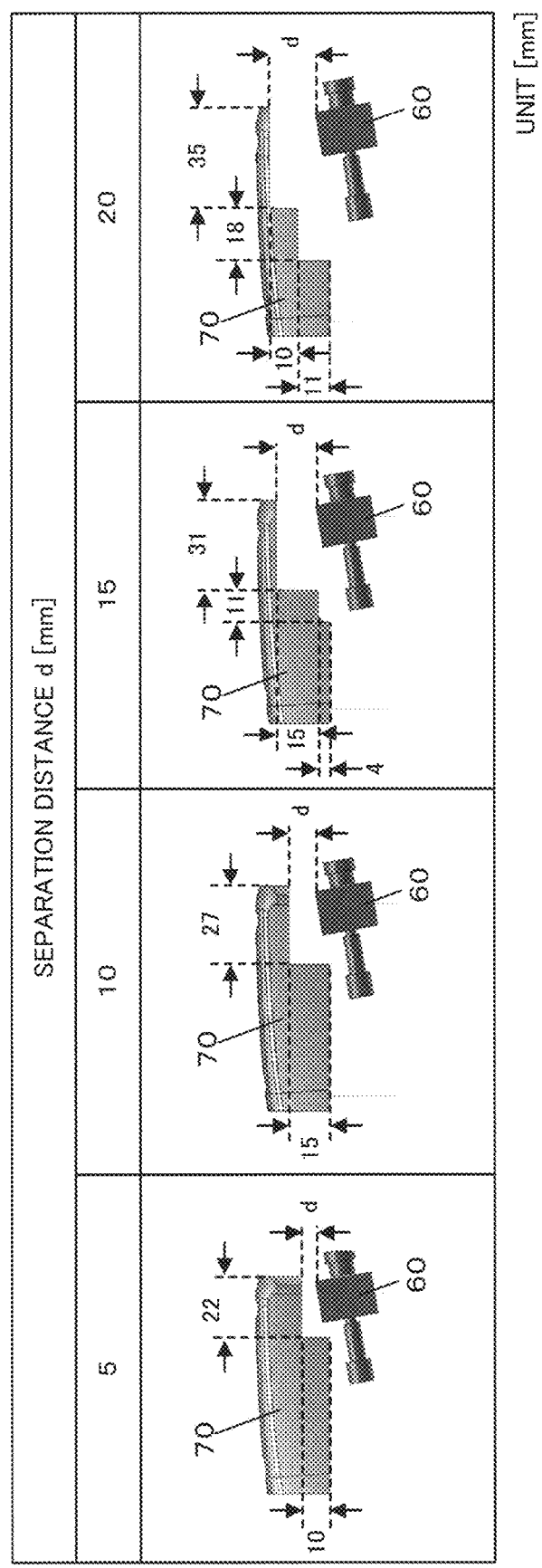
FIG. 15 is a diagram illustrating exemplary shape change of the capacitance loading element based on the separation distance.

FIG. 14 is a diagram illustrating the relation between a separation distance d between the capacitance loading element 70 and the camera 60 and the horizontal-plane average gain of the antenna device 10 for the vehicle against noise in an FM wave band. Since the installation positions of the capacitance loading element 70 and the camera 60 are fixed in the antenna device 10 for the vehicle, the shape of the capacitance loading element 70 is changed as illustrated in FIG. 15 based on the separation distance d illustrated in FIG. 14. Specifically, the shape of the capacitance loading element 70 is changed so that the separation distance d is 5 mm, 10 mm, 15 mm, 20 mm, and 25 mm. The shape of the capacitance loading element 70 when the separation distance d is 25 mm is not illustrated. The separation distance d is the shortest distance between the capacitance loading element 70 and the camera 60 as illustrated in FIG. 15. The separation distance d is the shortest distance three-dimensionally determined from the positional relation between the capacitance loading element 70 and the camera 60. In FIG. 14, "WITH CAMERA" indicates a state in which the camera 60 is installed and activated. "WITHOUT CAMERA" indicates a state in which the camera 60 is removed, and the shape of the capacitance loading element 70 is same as that for "WITH CAMERA". In FIG. 14, the camera cable 18 of the camera 60 is a coaxial cable containing no magnetic body, but may be a magnetic cable. The camera cable 18 is grounded.

As illustrated in FIG. 15, the shape of the capacitance loading element 70 is changed so that the area of the capacitance loading element 70 decreases as the separation distance d increases. Accordingly, as illustrated in FIG. 14, antenna sensitivity decreases as the separation distance d increases. Specifically, the antenna sensitivity is at similar levels when the separation distance d is 15 mm or shorter, but the antenna sensitivity is lower when the separation distance d is 20 mm or longer.

The difference in the antenna sensitivity between "WITH CAMERA" and "WITHOUT CAMERA" is −1.1 dB or smaller when the separation distance d is 15 mm or longer, but the difference exceeds −1.1 dB when the separation distance d is 10 mm or shorter. Specifically, the antenna sensitivity with the camera 60 can be made substantially equivalent to that without the camera 60 by setting the separation distance d to be 15 mm. Thus, the shortest distance between the capacitance loading element 70 and the camera 60 is desirably at least 15 mm.

Sixth Example of Modifications

In the above-described embodiment, the antenna 50 receives waves in an AM/FM wave band, but the embodiment is not limited thereto. The antenna 50 may receive, for example, waves in a digital audio broadcast (DAB) wave band. In such a case, the shape of a capacitance loading element configured to receive waves in the DAB wave band is similar to that of the capacitance loading element 70 of the above-described embodiment. The DAB wave band is a frequency band higher than the AM/FM wave band, and thus the size of the capacitance loading element configured to receive waves in the DAB wave band may be smaller than that of the capacitance loading element 70 of the above-described embodiment. For example, the capacitance loading element configured to receive waves in the DAB wave band may be disposed at a position separated from the camera 60 with its longitudinal direction being aligned with the optical axis direction of the camera 60 so that the capacitance loading element partially overlaps the camera 60 in top view but does not overlap the camera 60 in side view. When the capacitance loading element configured to receive waves in the DAB wave band is divided into a short-distance-side portion and a long-distance-side portion based on the distance from the camera 60, the short-distance-side portion includes a first portion and a second portion. The first portion overlaps the camera 60 in top view but does not overlap the camera 60 in side view. The second portion is positioned closer to the front of the vehicle than the first portion and does not overlap the camera 60 in top view and side view. The length of the first portion is set to be shorter than that of the second portion in the height direction.

Figure 16:
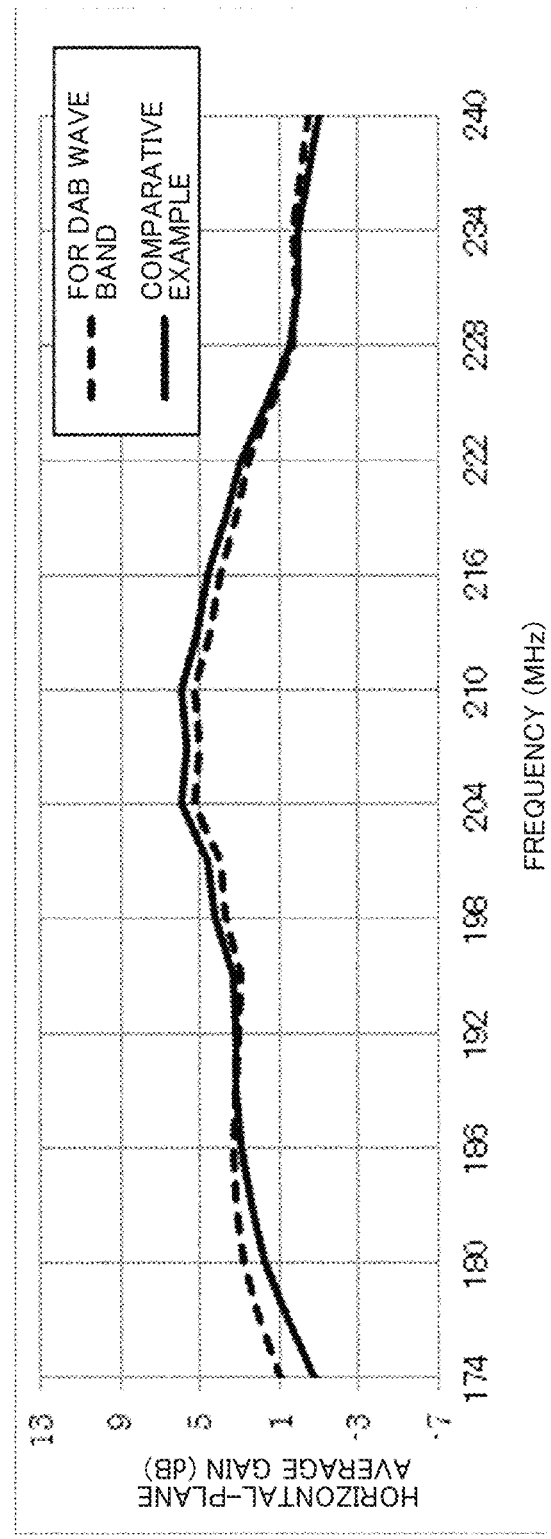
FIG. 16 is a graph illustrating the horizontal-plane average gain of an antenna device for the vehicle including a capacitance loading element for reception of waves in a DAB wave band.

FIG. 16 is a graph illustrating characteristics of the horizontal-plane average gain of an antenna device for the vehicle in which the capacitance loading element 70 of the above-described embodiment is replaced with the capacitance loading element configured to receive waves in the DAB wave band. The solid line indicates the gain of the antenna device for the vehicle including the capacitance loading element configured to receive waves in the DAB wave band. The dashed line corresponds to a comparative example. A capacitance loading element of the comparative example has a configuration in which a portion corresponding to the first portion of the capacitance loading element configured to receive waves in the DAB wave band overlaps the camera 60 in top view and side view. In FIG. 16, the camera cable 18 of the camera 60 is a coaxial cable containing no magnetic body, but may be a magnetic cable. The camera cable 18 is grounded.

The antenna device for the vehicle including the capacitance loading element configured to receive waves in the DAB wave band is designed so that the capacitance loading element is separated from the camera 60 as far as possible and the area of a part of overlapping the camera 60 in top view and side view is as small as possible. Accordingly, electromagnetic influence of the camera body 62 on the outside is reduced even when the metal housing 64 is disposed, and the horizontal-plane average gain is higher than that in the comparative example at a frequency of 190 MHz to 228 MHz on the horizontal axis in the graph.

EXPLANATION OF REFERENCES 10 antenna device for the vehicle
12 outer case
18 camera cable
20 inner case
30 antenna base
50 antenna
57 antenna substrate
60 camera
62 camera body
64 metal housing
70 capacitance loading element
71 right element
72 left element
73 element coupling part
74 long-distance-side portion
75 short-distance-side portion
76 first portion
77 second portion

The invention claimed is:

1. An antenna device for a vehicle, the antenna device comprising:
an antenna;
a camera; and
a case that accommodates the antenna and the camera, wherein
the antenna includes a capacitance loading element disposed at a position separate from the camera, and
when the capacitance loading element is divided into a short-distance-side portion and a long-distance-side portion based on a distance from the camera, a length of a first portion of the short-distance-side portion is shorter than a length of a second portion of the short-distance-side portion in a height direction, in which the first portion overlaps the camera in top view and/or side view while the second portion does not overlap the camera in top view and/or side view.

2. The antenna device for the vehicle according to claim 1, wherein the capacitance loading element is disposed with a longitudinal direction of the capacitance loading element being aligned with an optical axis direction of the camera, and a longitudinal length of the capacitance loading element is longer than a longitudinal length of the camera.

3. The antenna device for the vehicle according to claim 1, wherein at least a part of the capacitance loading element has a meander wiring shape.

4. The antenna device for the vehicle according to claim 1, wherein the first portion is formed to have a length gradually decreasing in the height direction as a distance from the second portion increases.

5. The antenna device for the vehicle according to claim 1, wherein, among a first position and a second position of the first portion, the first position is closer to the second portion than the second position, and a length of the first portion at the first position in the height direction is longer than a length of the first portion at the second position in the height direction.

6. The antenna device for the vehicle according to claim 1, wherein the capacitance loading element is disposed at a position higher than the camera.

7. The antenna device for the vehicle according to claim 1, further comprising an inner case accommodated in the case, wherein the capacitance loading element and the camera are disposed in a space between the case and the inner case.

8. The antenna device for the vehicle according to claim 1, wherein
the camera captures a rearview of the vehicle when installed on a roof of the vehicle, and
the first portion is positioned closer to a rear of the vehicle than the second portion.

9. The antenna device for the vehicle according to claim 1, wherein the camera includes a camera body and a metal housing that accommodates the camera body.

10. The antenna device for the vehicle according to claim 1, wherein a cable of the camera includes a magnetic body.

11. The antenna device for the vehicle according to claim 10, wherein an external conductor of the cable of the camera is grounded.

12. The antenna device for the vehicle according to claim 1, further comprising:
a camera cable connected to the camera; and
a cable holder which separates a wiring position of the camera cable from the antenna.

13. The antenna device for the vehicle according to claim 12, wherein the cable holder has a partition wall.

14. The antenna device for the vehicle according to claim 7, wherein the capacitance loading element is disposed above and outside the inner case.

15. The antenna device for the vehicle according to claim 14, wherein the capacitance loading element is fixed to an upper surface of the inner case with a screw.

* * * * *